April 14, 1953  J. J. HUITEMA  2,634,567
STALK SHREDDER
Filed Aug. 29, 1950
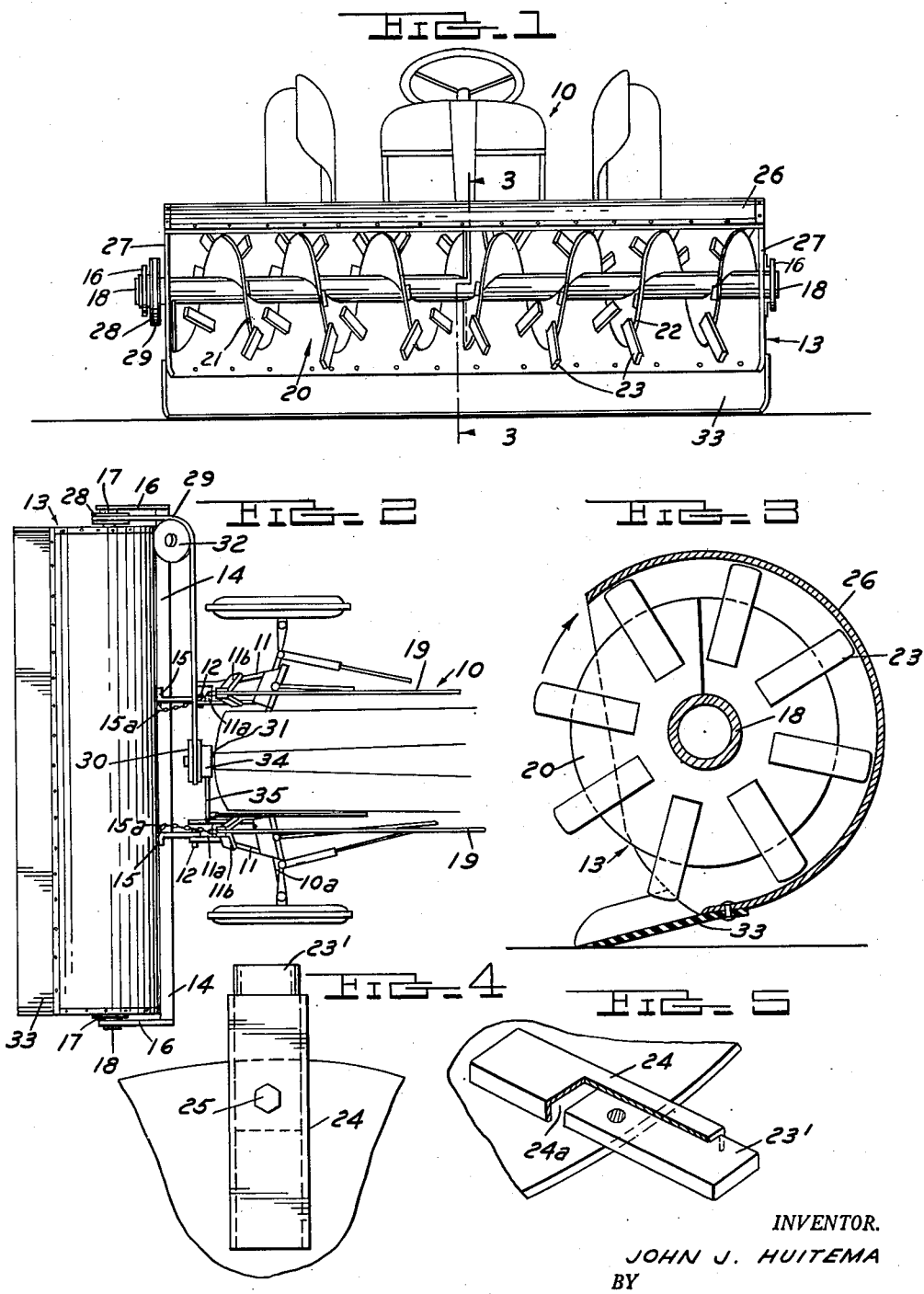
INVENTOR.
JOHN J. HUITEMA
BY
*W. W. Schaich*
ATTORNEY Patented Apr. 14, 1953

2,634,567

UNITED STATES PATENT OFFICE 2,634,567

STALK SHREDDER

John J. Huitema, New Paris, Ind.

Application August 29, 1950, Serial No. 182,048

1 Claim. (Cl. 55—118)

This invention relates to an improved implement of the type commonly referred to as stalk shredding machines, which is useful in cutting or shredding vegetational residue and brush to facilitate covering of such trash material in subsequent plowing of the land.

In my pending application, Serial 718,743, filed December 27, 1946, now Patent No. 2,537,586, issued January 9, 1951, there is disclosed and claimed a stalk shredding machine which provides improved cutting and shredding action by employment of a novel configuration of the rotary element which effects the shredding. The rotary element there disclosed and claimed comprises a helically shaped body portion having a plurality of cutting teeth formed along its helical edge. A cover or shield was mounted about the top peripheral portions of such rotary element and cooperated therewith to trap vegetation encountered by the rotary cutting element so that a lateral displacement of such vegetation was produced by the helical body portion of the rotary cutting element to subject the vegetation to repeated contacts by the cutting teeth. This invention provides further improvements in the construction and arrangement of this type of rotary cutting element which materially increase the efficiency of its shredding action.

Accordingly, it is an object of this invention to provide an improved farm implement of the type commonly known as a stalk shredder.

A particular object of this invention is to provide an improved rotary cutting element for a stalk shredder characterized by the employment of a plurality of helical body portions mounted coaxially in adjacent relationship and having cutting teeth formed on their helical peripheries but having the effective pitch of the adjacent sections reversed so that each section tends to feed vegetation contacted toward the other section, thereby insuring repeated contacts of the cutting blades with the vegetation to be shredded and promoting the effectiveness of the shredding action.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Fig. 1 is a front elevational view of a stalk shredding device constructed in accordance with this invention, shown mounted on the front end of a tractor.

Fig. 2 is a reduced scale plan view of Fig. 1.

Fig. 3 is an enlarged scale sectional view taken on the plane 3—3 of Fig. 1.

Fig. 4 is a partial side elevational view of a portion of the periphery of the rotary cutting element, showing a modified mounting of the cutting teeth.

Fig. 5 is a detail elevational view, partly in section, of a portion of the periphery of the cutting element, illustrating the modified mounting of the cutting teeth.

As shown on the drawings:

The stalk shredding device embodying this invention will be described in connection with its use as a front mounted implement on a well known agricultural tractor 10, but it will be apparent to those skilled in the art that it may be mounted in trailed relationship to the tractor if so desired. The details of the mounting of the implement on the tractor form no part of the invention and hence will not be described in detail beyond pointing out that a pair of mounting brackets 11 are suitably fastened to spaced points on the tractor front axle 10a and at their outer extremities define bifurcated portions 11a which are traversed by a mounting bolt 12. The stalk shredding device is indicated generally by the numeral 13 and embodies a main transverse frame member 14 to which a pair of rearwardly projecting transversely spaced mounting brackets 15 are secured. The ends of mounting brackets 15 are respectively supported by mounting bolts 12. The vertical position of main transverse frame 14 and hence of the entire stalk shredding machine may be conveniently controlled by chain connections 15a from brackets 15 respectively to a pair of pivoted lift brackets 11b which are respectively pivoted on support brackets 11. The angular position of lift brackets 11a may be conveniently controlled by the hydraulically lifted hitch links conventionally provided at the rear of tractor 10 through the connection of links 19 between lift brackets 11a and such hitch links.

At each lateral end of main frame member 14, a forwardly projecting arm 16 is rigidly secured and a bearing unit 17 is mounted in the forward end of each arm 16 to respectively support the ends of a horizontal shaft 18 which carries a rotary cutting element 20 to be hereinafter described. The rotary cutting element 20 embodies a plurality of helically or auger shaped body portions or vanes which are respectively mounted along shaft 18 in coaxial relationship.

In the particular embodiment illustrated in the drawings, the rotary cutting element embodies two such helical body portions 21 and 22 respectively. Each helical body portion has a plurality of cutting blades 23 rigidly secured in spaced relationship to its helical periphery. In the modification of Figs. 1-3, the blades 23 are welded to the peripheries of the helical body portions. In the modification of Figs. 4 and 5, channel shaped cutting tooth mounting brackets 24 are welded in spaced relationship along each helical body portion and thus define a pocket 24a in which a cutting tooth 23' may be snugly inserted. Each cutting tooth 23' may conveniently comprise a piece of rectangular bar stock and each cutting tooth 23' is secured within its corresponding mounting bracket 24 by a transverse bolt 25. Hence the teeth 23' may be conveniently replaced when worn or broken.

A partial cylindrical shield 26 is rigidly secured to main transverse frame member 14 and extends over the rear and top peripheral portions of the rotary cutting element 20. Suitable side plates 27 are formed on the opposite ends of the shield or cover 26. The cover 26 performs two functions. The obvious function is that of preventing loose materials contacted by the rotary cutting element from being thrown backwardly to endanger the tractor or the operator. The second function of the shield is to cooperate with the rotary cutting element 20 so as to trap the vegetation between the helical body portions of such cutting element and the shield so that each helical body portion acts upon the vegetation to shift it axially and thus permit it to be repeatedly contacted by the cutting teeth 23.

In accordance with this invention, the pitch of each of the adjacent helical body portions 21 and 22 are reversed relative to each other so that each helical body portion tends to displace vegetation contacted toward the other. This has the effect of producing a concentration of such vegetation in the center portions of the rotary cutting element and greatly increases the number of contacts that the cutting teeth 23 have with such vegetation.

Rotary cutting element 20 is power driven from a suitable power-take-off on the tractor in any convenient manner. For example, a pulley 28 may be mounted on one projecting end of the shaft 18 and be driven by a belt 29 which is trained over a pulley 30 mounted on a power-take-off shaft 31 conventionally provided at the front end of the tractor 10 which is directly driven by the engine crank shaft. A pair of guide pulleys 32 are mounted in suitable fashion at the outer extremities of main transverse frame member 14 to effect the 90° shift required in belt 29. For more convenient control of the rotary shredding element 20, a clutch 34 of conventional construction may be mounted intermediate pulley 20 and shaft 31 and controlled by a suitable operating linkage 35 which extends up to a position near the operator's seat.

The direction of rotation of the rotary shaft 20 is quite important to the effectiveness of the operation of the rotary cutting element 20 and such shaft is rotated in such direction that the bottom peripheral portions of each helical body portion 21 and 22 move in contra-direction to the forward travel of the tractor. This assures that the vegetation contacted by the rotary cutting element 20 will tend to be picked up and carried over the top of the rotary cutting element 20 and trapped between such element and the shield 26.

To further protect the tractor operator from the dust which is inherently produced by the operation of the stalk shredder, it is often desirable to provide a rubber-like guard strip 33 along the bottom edge of the shield 26 which will deform to some extent to conform to the ground irregularities and maintain contact with the ground as the stalk shredder is operated.

It is therefore apparent from the foregoing description that this invention provides an unusually simple, yet effective stalk shredding device which will subject any vegetation that is contacted by the rotary cutting element to repeated contacts by the cutting teeth of such cutting element and thus greatly augment the degree of shredding and cutting to which the vegetational material is subjected. Furthermore, the front mounting of the cutting element on the tractor coupled with the clutch control permits the operator to conveniently correlate the tractor travel with the size or amount of vegetation being acted upon. For example, the stalk shredder may be driven into engagement with a group of bushes or small trees and slowly advanced through such material so that complete shredding action is produced, inasmuch as the speed of rotation of the rotary cutting element is independent of the rate of travel of the tractor.

It will, of course, be understood that various details of construction may be varied through a wide range without departing from the principles of this invention and it is, therefore, not the purpose to limit the patent granted hereon otherwise than necessitated by the scope of the appended claim.

I claim:

In a tractor-drawn, stalk shredding machine, a frame adapted for connection to a tractor, a horizontal shaft journaled on said frame substantially transversely to the direction of tractor travel, a pair of helical vanes coaxially mounted on said shaft in end abutting relationship, said vanes having their radially inward edges abutting said shaft, a plurality of cutting teeth mounted in spaced relation along the radially outer edge of said vanes, a semi-cylindrical hood mounted on said frame in partially surrounding, overlying relationship to the rotary path of said cutting teeth, and means for rotating said shaft in the direction contra to the tractor wheel rotation, said vanes being respectively oppositely pitched and directed to axially move material contacted toward the other vane.

JOHN J. HUITEMA.

References Cited in the file of this patent

UNITED STATES PATENTS

| Number | Name | Date |
|--------|------|------|
| 2,000,249 | Pew | May 7, 1935 |
| 2,279,652 | Beard | Apr. 14, 1942 |
| 2,506,054 | Agee et al. | May 2, 1950 |
| 2,517,390 | Downing | Aug. 1, 1950 |
| 2,537,586 | Huitema | Jan. 9, 1951 |

FOREIGN PATENTS

| Number | Country | Date |
|--------|---------|------|
| 370,992 | Great Britain | Apr. 4, 1932 |